(12) United States Patent
Miyazaki

(10) Patent No.: US 8,544,513 B2
(45) Date of Patent: Oct. 1, 2013

(54) PNEUMATIC TIRE WITH TREAD HAVING CIRCUMFERENTIAL SIPES

(75) Inventor: Tetsuji Miyazaki, Osaka (JP)

(73) Assignee: Toyo Tire & Rubber Company Co., Ltd., Osaka (JP)

( * ) Notice: Subject to any disclaimer, the term of this patent is extended or adjusted under 35 U.S.C. 154(b) by 658 days.

(21) Appl. No.: 12/573,917

(22) Filed: Oct. 6, 2009

(65) Prior Publication Data
US 2010/0116393 A1    May 13, 2010

(30) Foreign Application Priority Data

Nov. 10, 2008  (JP) .................................. 2008-287955

(51) Int. Cl.
*B60C 11/03* (2006.01)
*B60C 11/12* (2006.01)

(52) U.S. Cl.
USPC ................ 152/209.8; 152/209.9; 152/209.22; 152/209.27; 152/DIG. 3

(58) Field of Classification Search
USPC ................ 152/209.8, 209.9, 209.21, 209.22, 152/209.23, 209.27, DIG. 3
See application file for complete search history.

(56) References Cited

U.S. PATENT DOCUMENTS

| | | | |
|---|---|---|---|
| 6,907,910 B2* | 6/2005 | Iwamura ................... | 152/DIG. 3 |
| 2005/0269004 A1* | 12/2005 | Miyabe et al. ............. | 152/209.9 |
| 2007/0199633 A1 | 8/2007 | Hayashi | |

FOREIGN PATENT DOCUMENTS

| | | | |
|---|---|---|---|
| JP | 62-241707 | | 10/1987 |
| JP | 62-241708 | | 10/1987 |
| JP | 02-225110 A | * | 9/1990 |
| JP | 07-257114 | | 10/1995 |
| JP | 09-142110 A | * | 6/1997 |
| JP | 2002-321509 | | 11/2002 |
| JP | 2004-026158 A | * | 1/2004 |
| JP | 2006-192929 | | 7/2006 |
| JP | 2006-192929 A | * | 7/2006 |
| JP | 2007-153104 | | 6/2007 |
| WO | 2006/001202 | | 1/2006 |
| WO | WO-2010/122805 A1 | * | 10/2010 |

OTHER PUBLICATIONS

Machine translation for Japan 2006-192929 (no date).*
Machine translation for Japan 09-142110 (no date).*
Machine translation for Japan 2004-026158 (no date).*
Office Action for Japanese Patent Application 2008-287955 dated Nov. 19, 2012.
Chinese Office Action issued on Jun. 8, 2013 in corresponding CN Application No. 200910161075.7.

* cited by examiner

*Primary Examiner* — Steven D Maki
(74) *Attorney, Agent, or Firm* — Fish & Richardson P.C.

(57) ABSTRACT

A pneumatic tire has a tread pattern including a plurality of main grooves extending along a tire circumferential direction, and a shoulder land portion constructed by a rib or a block row formed in an outer side in a tire width direction of the main groove positioned in an outermost side. A circumferential sipe is provided in each of the shoulder land portions in both sides in the tire width direction. The number of the circumferential sipes provided in the shoulder land portion in a vehicle inner side is larger than the number of the circumferential sipes provided in the shoulder land portion in a vehicle outer side.

8 Claims, 4 Drawing Sheets

PNEUMATIC TIRE WITH TREAD HAVING CIRCUMFERENTIAL SIPES

BACKGROUND OF THE INVENTION

1. Field of the Invention

The present invention relates to a pneumatic tire having a tread pattern including a plurality of main grooves extending along a tire circumferential direction, and a shoulder land portion constructed by a rib or block row.

2. Description of the Related Art

Various tread patterns are formed in a tread surface of a pneumatic tire in correspondence to a demanded tire performance and a used condition. Since there is a case that a cut called a sipe is formed in a land portion of the tread surface, and it is possible to seize on a road surface based on an edge effect of the sipe, it is possible to enhance a turning performance at a time of cornering and a braking performance at a time of braking, even on a wet road surface and a dry road surface, in addition to an ice and snow road surface.

Japanese Unexamined Patent Publication No. 2007-153104 describes a pneumatic tire in which a circumferential sipe is provided in a block, and a forming density of the circumferential sipe is made higher in a vehicle outer side than in a vehicle inner side. This is structured such as to enhance an edge effect in a lateral direction in the vehicle outer side at a time of cornering, thereby achieving an improvement of the turning performance. However, as a result of research work of the present inventor, it is known that there is a tendency that a ground area cannot be sufficiently obtained in the vehicle inner side at a time of cornering according to the structure mentioned above, and there is room for improvement of the turning performance.

Japanese Unexamined Patent Publication No. 7-257114 describes a pneumatic tire in which a tread pattern is formed bilaterally asymmetrically, an exhaust groove is provided in a block in a vehicle inner side, and an exhaust groove is not provided in a block in a vehicle outer side. The exhaust groove extends along a tire circumferential direction, and has a function of communicating sipes in a width direction with each other so as to lower a noise. In the structure mentioned above, since the circumferential sipe is not formed in the vehicle outer side, there is a problem that the edge effect in the lateral direction at a time of cornering tends to come short and the turning performance becomes insufficient.

Japanese Unexamined Patent Publication No. 2006-192929 describes a pneumatic tire in which a tread pattern is formed bilaterally asymmetrically, and the number of the sipes in the width direction provided in the block in the vehicle inner side is made larger than the number of the sipes in the width direction provided in the block in the vehicle outer side. However, this tire structure is provided for improving a snow steering stability, and does not suggest any solving means for securing the ground area in the vehicle inner side at a time of cornering, and further for enhancing the turning performance.

SUMMARY OF THE INVENTION

The present invention is made in view of the above circumstances, and an object thereof is to provide a pneumatic tire which can achieve an excellent turning performance and an excellent braking performance.

The object can be achieved by the following present invention. That is, the present invention provides a pneumatic tire having a tread pattern including a plurality of main grooves extending along a tire circumferential direction, and a shoulder land portion constructed by a rib or a block row formed in an outer side in a tire width direction of the main groove positioned in an outermost side, wherein a circumferential sipe is provided in each of the shoulder land portions in both sides in the tire width direction, and the number of the circumferential sipes provided in the shoulder land portion in a vehicle inner side is larger than the number of the circumferential sipes provided in the shoulder land portion in a vehicle outer side.

In the pneumatic tire according to the present invention, since the number of the circumferential sipes provided in the shoulder land portion in the vehicle inner side is larger than the number of the circumferential sipes provided in the shoulder land portion in the vehicle outer side, it is possible to secure the ground area in the vehicle inner side at a time of cornering so as to enhance the turning performance. This is because the ground shape at a time of cornering is long in the vehicle outer side and short in the vehicle inner side, however, the present invention can expand the ground area in the vehicle inner side so as to improve a grip performance, by enhancing the edge effect in the lateral direction generated by the circumferential sipe in the vehicle inner side.

Further, according to the present invention, it is possible to enhance the braking performance at a time of braking. This is because a load in the vehicle inner side becomes large particularly in front tires at a time of braking, however, the present invention can improve the grip performance based on an enhancement of the edge effect in the lateral direction generated by the circumferential sipe in the vehicle inner side. Since the tread surface is pressed against the road surface at an angle corresponding to a camber even in the tire width direction, the edge effect in the lateral direction can contribute to the improvement of the braking performance.

In the present invention, it is preferable that the shoulder land portion in the vehicle inner side is constructed by the block row, and at least one of the circumferential sipes provided in the shoulder land portion in the vehicle inner side extends while shifting its position in the tire width direction in the center portion in the tire circumferential direction of the block.

According to the structure mentioned above, since at least one of the circumferential sipes provided in the shoulder land portion in the vehicle inner side has the offset shape as mentioned above, it is possible to achieve an engaging effect between the block pieces sectionalized by the circumferential sipes, at a time of braking. As a result, it is possible to suppress a rigidity reduction of the blocks constructing the shoulder land portion in the vehicle inner side, and it is possible to improve the braking performance by enhancing the grip performance.

In the present invention, it is preferable that a sipe in a width direction is provided in each of the shoulder land portions in both sides in the tire width direction, and the number of the sipes in the width direction provided in the shoulder land portion in the vehicle inner side is larger than the number of the sipes in the width direction provided in the shoulder land portion in the vehicle outer side.

Accordingly, in cooperation with the enlargement of the load in the vehicle inner side particularly in the front tires at a time of braking, it is possible to enhance the edge effect generated by the sipes in the width direction in the vehicle inner side so as to improve the grip performance, and it is possible to achieve an excellent braking performance.

In the above structure, it is preferable that the sipe in the width direction provided in each of the shoulder land portions in both sides in the tire width direction is constructed by a waveform sipe having a three-dimensional structure in which wall surfaces are engageable with each other in a depth direction, and a wavelength of the sipe in the width direction provided in the shoulder land portion in the vehicle inner side is smaller than a wavelength of the sipe in the width direction provided in the shoulder land portion in the vehicle outer side.

Accordingly, since the engaging action between the wall surfaces in the sipes in the width direction becomes larger in the vehicle inner side than in the vehicle outer side, it is possible to suppress the rigidity reduction of the block constructing the shoulder land portion in the vehicle inner side so as to achieve a more excellent braking performance, and it is possible to suppress a toe and heel wear with respect to the sipes in the width direction provided in the block.

DETAILED DESCRIPTION OF THE PREFERRED EMBODIMENTS

Figure 1:
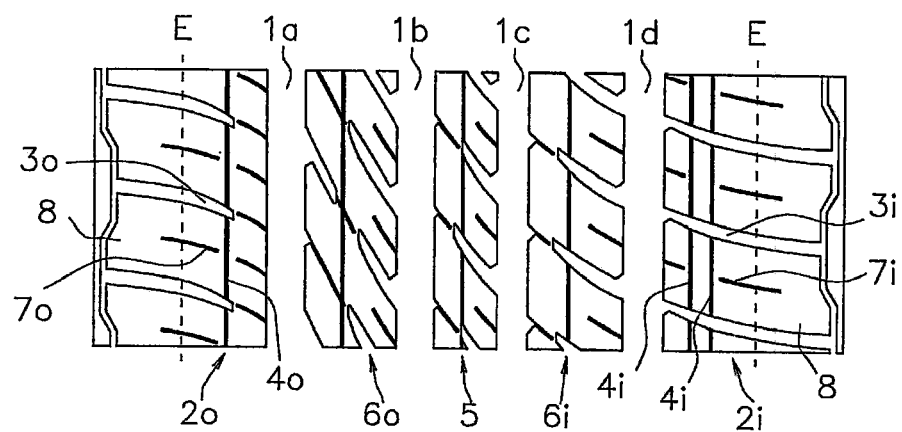
FIG. 1 is an expansion plan view showing an example of a tread surface of the pneumatic tire of the invention.

An embodiment of the present invention will be explained with reference to the drawings. FIG. 1 is an expansion plan view showing an example of a tread surface of the pneumatic tire of the invention. The tire is an installing direction designated type tire having a bilaterally asymmetrical tread pattern, a right side in the drawing comes to a vehicle inner side, and a left side in the drawing comes to a vehicle outer side at a time of being installed to the vehicle. Reference symbol E denotes a ground end.

The tread surface is provided with four main grooves 1a to 1d extending along a tire circumferential direction, and five block rows sectionalized by them. Shoulder land portions 2o and 2i are formed in an outer side in a tire width direction of the main grooves 1a and 1d which are positioned in an outermost side, and the block rows constructing them are constituted by a plurality of blocks 8 sectionalized by lateral grooves 3o and 3i. The other land portions than the shoulder land portion 2i are constructed by the block rows constituted by a plurality of substantial blocks connected partly in the tire circumferential direction.

Circumferential sipes 4o and 4i are provided respectively in the shoulder land portions 2o and 2i in both sides in the tire width direction, and the number of the circumferential sipes 4i provided in the shoulder land portion 2i in the vehicle inner side is larger than the number of the circumferential sipes 4o provided in the shoulder land portion 2o in the vehicle outer side. Specifically, the number of the circumferential sipes 4i is two, and the number of the circumferential sipe 4o is one.

Accordingly, it is possible to secure the ground area in the vehicle inner side at a time of cornering so as to enhance the turning performance.

Figure 2:
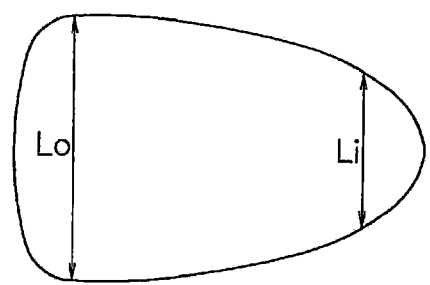
FIG. 2 is a view schematically showing a ground shape at a time of cornering.

In other words, the ground shape becomes long in the vehicle outer side and short in the vehicle inner side at a time of cornering as shown in FIG. 2 (Lo>Li), however, it is possible to apply the edge effect in the lateral direction in such a manner as to enhance the edge effect in the vehicle inner side and expand the ground area in the vehicle inner side by setting the number of the circumferential sipes 4i than the number of the circumferential sipes 4o, thereby improving the grip performance. In the light of suitably achieving the operation and effect mentioned above, an angle of inclination of the circumferential sipe 4i with respect to the tire circumferential direction is preferably within 10°, and more preferably within 7°.

Further, according to the tire mentioned above, it is possible to enhance the braking performance at a time of braking. This is because a load in the vehicle inner side becomes large particularly in front tires at a time of braking, however, the grip performance is improved based on an enhancement of the edge effect in the lateral direction in the vehicle inner side. Further, since the rigidity of the land portion in the vehicle inner side is lowered by the number difference of the circumferential sipes, ride comfort is improved.

In the present embodiment, the circumferential sipes are formed in the center land portion 5 formed in the center in the tire width direction, and the mediate land portions 6o and 6i formed in both sides thereof, however, the present invention is not limited thereto. It is preferable that the circumferential sipes are provided in the mediate land portion 6i in the vehicle inner side, whereby it is possible to somewhat contribute to the effect of improving the turning performance and the braking performance.

In the tread surface shown in FIG. 1, sipes 7o and 7i in the width direction are provided respectively in the shoulder land portions 2o and 2i. The sipes 7o and 7i in the width direction extend in such a direction as to intersect the circumferential sipes 4o and 4i, and the number of the sipes 7i in the width direction per block in the shoulder land portion 2i is the same as the number of the sipes 7o in the width direction per block in the shoulder land portion 2o. Specifically, the number of the sipe 7i is one, and the number of the sipe 7o is one.

Figure 3:
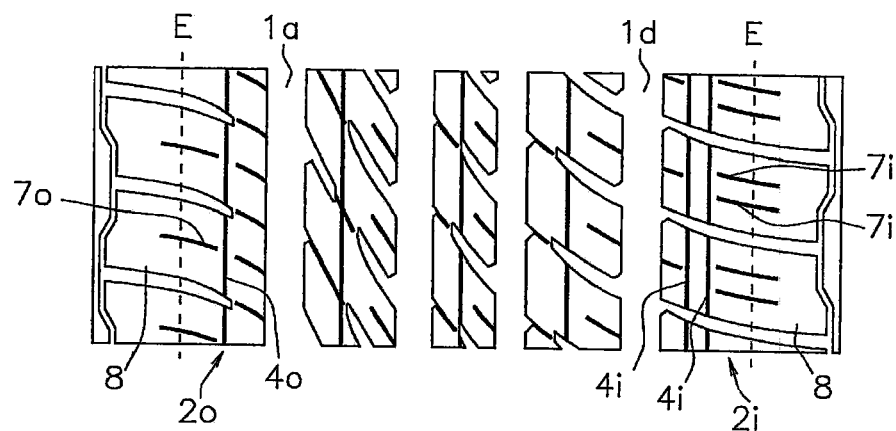
FIG. 3 is a development view showing an example of a tread surface according to another embodiment of the present invention.

A tread surface shown in FIG. 3 is the same as the tread surface in FIG. 1 except the matter that the number of the sipes 7i in the width direction provided in the shoulder land portion 2i is larger than the number of the sipes 7o in the width direction provided in the shoulder land portion 2o. In this tread surface, the number of the sipes 7i in the width direction is two, and the number of the sipe 7o in the width direction is one. According to the structure mentioned above, since it is possible to enhance the edge effect in the lateral direction in the vehicle inner side so as to improve the grip performance, it is possible to achieve a more excellent braking performance in cooperation with the operation and effect caused by the number difference of the circumferential sipes.

Figure 4:
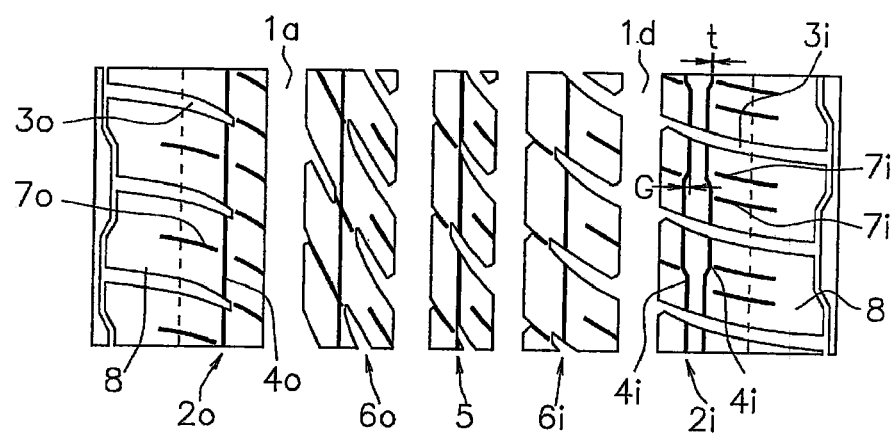
FIG. 4 is a development view showing an example of a tread surface according to another embodiment of the present invention.

A tread surface shown in FIG. 4 is the same as the tread surface in FIG. 3 except the matter that the circumferential sipe 4i provided in the shoulder land portion 2i is formed into an offset shape. The offset shape is structured such that the circumferential sipe 4i extends in the center portion in the tire circumferential direction of the block 8 while shifting its position in the tire width direction. In other words, the circumferential sipe 4i has an inclined portion in the center portion of the block 8, and positions in the tire width direction of both end portions which are approximately in parallel to the tire circumferential direction are shifted from each other. The offset shape mentioned above is applied to at least one of the circumferential sipes 4i provided in the shoulder land portion 2i.

In this case, since the engaging effect between the block pieces sectionalized by the circumferential sipes 4i is achieved at a time of braking, it is possible to suppress the rigidity reduction of the block 8 constructing the shoulder land portion 2i, and it is possible to enhance the grip performance so as to improve the braking performance. In the light of securing the operation and effect mentioned above, it is preferable that an offset amount G corresponding to an amount of displacement in the tire width direction is twice or more a thickness t of the circumferential sipe 4i.

Figure 5:
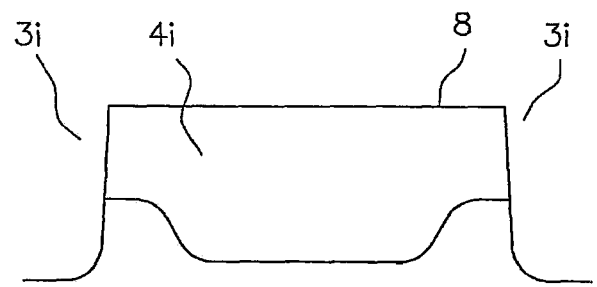
FIG. 5 is a front elevational view showing a wall surface of a circumferential sipe.

The circumferential sipe 4i is formed by lifting up both end portions in a longitudinal direction in such a manner as to suppress the rigidity reduction at a position which is open to the lateral groove 3i, as shown in FIG. 5, and therefore, the rigidity of the center portion becomes comparatively low. The inclined portion of the circumferential sipe 4i is arranged within the center portion having no lift-up portion. Accordingly, the engaging effect can be generated in the center portion having the low rigidity, and it is possible to uniformly enhance the rigidity of the block 8.

The offset shape may be applied to the circumferential sipe 4o provided in the shoulder land portion 2o in the vehicle outer side, and may be applied to the other circumferential sipes provided in the center land portion 5 and the mediate land portions 6o and 6i.

Figure 6:
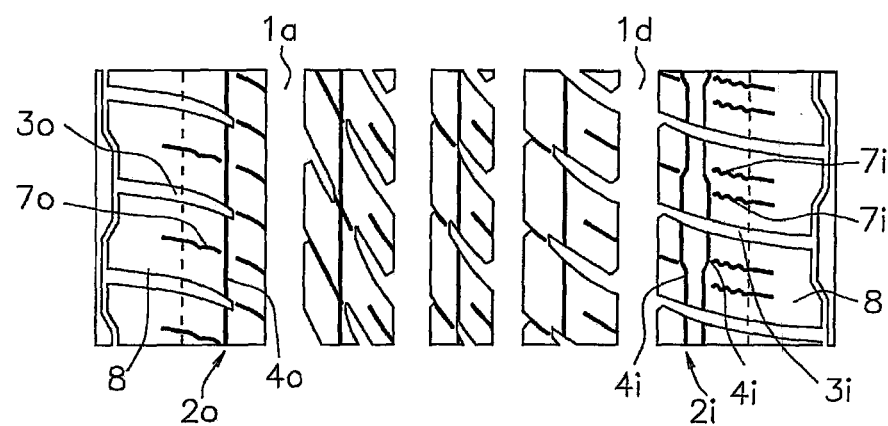
FIG. 6 is a development view showing an example of a tread surface according to another embodiment of the present invention.
Figure 7:
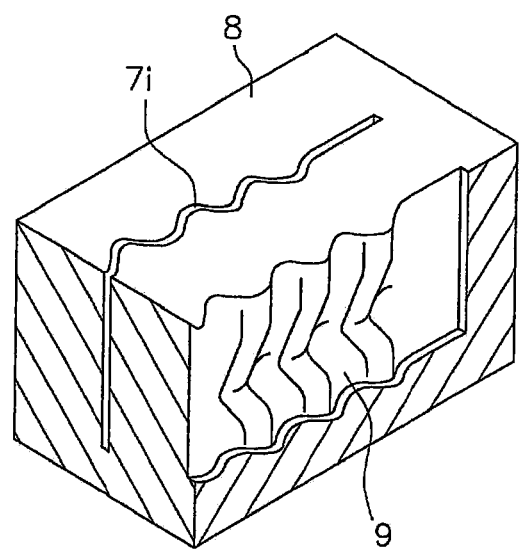
FIG. 7 is a perspective view showing a wall surface of a waveform sipe having a three-dimensional structure.

The tread surface shown in FIG. 6 is the same as the tread surface in FIG. 4 except the matter that the sipes 7o and 7i in the width direction provided respectively in the shoulder land portions 2o and 2i are constructed by a waveform sipe having a three-dimensional structure. The waveform sipe has a wall surface shape, for example, as shown in FIG. 7, and is structured such that the wall surfaces can be engaged with each other in a depth direction. In the present embodiment, a concavo-convex streak in a wall surface 9 of the sipe 7i in the width direction has a portion which is bent into a laterally V-shaped form in the middle of a depth direction, and is inclined to a longitudinal direction side. The waveform sipe having the three-dimensional structure as mentioned above is in detail described in Japanese Unexamined Patent Publication No. 2002-321509 filed by the present applicant.

In the tread surface, a wavelength of the sipe 7i in the width direction provided in the shoulder land portion 2i is smaller than a wavelength of the sipe 7o in the width direction provided in the shoulder land portion 2o, and the engaging action between the wall surfaces of the sipes in the width direction is larger in the vehicle inner side than in the vehicle outer side, when the block 8 slants at a time of braking. Accordingly, it is possible to suppress the rigidity reduction of the block 8 constructing the shoulder land portion 2i so as to achieve a more excellent braking performance, and it is possible to suppress a toe and heel wear with respect to the sipe 7i in the width direction.

Further, in the structure mentioned above, it is preferable to make an amplitude of the sipe 7i in the width direction provided in the shoulder land portion 2i larger than an amplitude of the sipe 7o in the width direction provided in the shoulder land portion 2o. According to the structure mentioned above, the engaging action between the wall surfaces of the sipes in the width direction becomes further larger in the vehicle inner side than in the vehicle outer side, and it is possible to effectively improve the braking performance.

The pneumatic tire in accordance with the present invention is the same as the normal pneumatic tire except the arrangement as mentioned above of the circumferential sipe in the tread surface, and the present invention can employ any of the conventionally known material, shape, structure, manufacturing method and the like.

The tread pattern of the pneumatic tire according to the present invention is not limited to the embodiment mentioned above, but may be structured, for example, such that the shoulder land portion is constructed by a rib in place of the block row. In the present invention, the main groove may extend in a zigzag shape along the tire circumferential direction, and the number of the main grooves may be two or more.

EXAMPLE

An example tire which concretely shows the structure and effect of the present invention will be explained. An evaluation of each of performances is executed as follows.

(1) Turning Performance

A cornering travel was carried out on a dry road surface, and a subjective evaluation was carried out according to a feeling test. An evaluation is shown by an index number in the case of setting a comparative example 1 to 100, and indicates that the larger the numerical value is, the better the turning performance is.

(2) Braking Performance

A braking travel was carried out on a wet road surface, and a subjective evaluation was carried out according to a feeling test. An evaluation is shown by an index number in the case of setting a comparative example 1 to 100, and indicates that the larger the numerical value is, the better the braking performance is.

(3) Ride Comfort

A travel was carried out on a general road surface, and a subjective evaluation was carried out according to a feeling test. An evaluation is shown by an index number in the case of setting a comparative example 1 to 100, and indicates that the larger the numerical value is, the better the ride comfort is.

In the tests (1) to (3) mentioned above, the size of the tire to be evaluated was set to 235/55R18, the pneumatic pressure was set to 210 kPa, the rim size was set to 18×7-JJ, and the vehicle to be evaluated was set to a domestic SUV (4WD, 3000 cc). The comparative examples 1 and 2 and the examples 1 to 4 were structured such that the number of the circumferential sipe and the number of the sipe in the width direction are differentiated, in the tread pattern as shown in FIG. 1. In the example 3, the circumferential sipe was formed into the offset shape as shown in FIG. 4, and in the example 4, the sipe in the width direction was formed into the waveform sipe having the three-dimensional structure so as to be differentiated in the wavelength, as shown in FIG. 6. Results of the evaluation are shown in Table 1.

TABLE 1

| | | comparative example 1 | comparative example 2 | example 1 | example 2 | example 3 | example 4 |
|---|---|---|---|---|---|---|---|
| number of circumferential sipes | vehicle outer side | 1 | 2 | 1 | 1 | 1 | 1 |
| | vehicle inner side | 1 | 1 | 2 | 2 | 2 | 2 |

TABLE 1-continued

|  |  | comparative example 1 | comparative example 2 | example 1 | example 2 | example 3 | example 4 |
|---|---|---|---|---|---|---|---|
| number of sipes in width direction | vehicle outer side | 1 | 1 | 1 | 1 | 1 | 1 |
|  | vehicle inner side | 1 | 1 | 1 | 2 | 2 | 2 |
| offset shape of circumferential sipe | | no | no | no | no | yes | yes |
| three-dimensional structure of sipe in width direction | | no | no | no | no | no | yes |
| turning performance | | 100 | 96 | 104 | 106 | 106 | 107 |
| braking performance | | 100 | 100 | 103 | 105 | 107 | 108 |
| ride comfort performance | | 100 | 103 | 104 | 106 | 105 | 103 |

From Table 1, the examples 1 to 4 achieve excellent turning performance and excellent braking performance in comparison with the comparative examples 1 and 2, and further improve the ride comfort performance. In the example 1, the total sipe number is the same as the comparative example 2, however, the turning performance and the braking performance are more excellent than the comparative example 2, and it is known that it is significant to make the number of the circumferential sipes of the shoulder land portion larger in the vehicle inner side than in the vehicle outer side. Further, the example 3 and the example 4 can achieve the excellent turning performance and excellent braking performance respectively by employing the offset shape, and employing the wavelength difference of the waveform sipe of the three-dimensional structure.

What is claimed is:

1. A pneumatic tire having a tread pattern including a plurality of main grooves extending along a tire circumferential direction, and a shoulder land portion constructed by a rib or a block row formed in an outer side in a tire width direction of the main groove positioned in an outermost side,
    wherein a circumferential sipe is provided in each of the shoulder land portions in both sides in the tire width direction, and the number of the circumferential sipes provided in the shoulder land portion in a vehicle inner side is larger than the number of the circumferential sipes provided in the shoulder land portion in a vehicle outer side,
    wherein the shoulder land portion in the vehicle inner side is constructed by a block row, and at least one of the circumferential sipes provided in the shoulder land portion in the vehicle inner side extends while shifting its position in the tire width direction in the center portion in the tire circumferential direction of the block, and
    wherein the circumferential sipe provided in the shoulder land portion in the vehicle inner side has one inclined portion in the center portion, and is structured such as to shift positions in the tire width direction of both end portions which are approximately in parallel to the tire circumferential direction from each other.

2. The pneumatic tire according to claim 1, wherein an angle of inclination of the circumferential sipe provided in the shoulder land portion in the vehicle inner side with respect to the tire circumferential direction is within 10°.

3. The pneumatic tire according to claim 1, wherein the circumferential sipe provided in the shoulder land portion in the vehicle inner side is open to a lateral groove.

4. The pneumatic tire according to claim 3, wherein both end portions in a longitudinal direction of the circumferential sipe provided in the shoulder land portion in the vehicle inner side are formed by being lifted up.

5. The pneumatic tire according to claim 1, wherein an offset amount of the circumferential sipe provided in the shoulder land portion in the vehicle inner side is equal to or more than twice a thickness of the circumferential sipe.

6. The pneumatic tire according to claim 1, wherein both end portions in a longitudinal direction of the circumferential sipe provided in the shoulder land portion in the vehicle inner side are formed by being lifted up, and the inclined portion is arranged within the center portion having no lift-up portion.

7. The pneumatic tire according to claim 1, wherein a sipe in a width direction is provided in each of the shoulder land portions in both sides in the tire width direction, and the number of the sipes in the width direction provided in the shoulder land portion in the vehicle inner side is larger than the number of the sipes in the width direction provided in the shoulder land portion in the vehicle outer side.

8. A pneumatic tire having a tread pattern including a plurality of main grooves extending along a tire circumferential direction, and a shoulder land portion constructed by a rib or a block row formed in an outer side in a tire width direction of the main groove positioned in an outermost side,
    wherein a circumferential sipe is provided in each of the shoulder land portions in both sides in the tire width direction, and the number of the circumferential sipes provided in the shoulder land portion in a vehicle inner side is larger than the number of the circumferential sipes provided in the shoulder land portion in a vehicle outer side,
    wherein a sipe in a width direction is provided in each of the shoulder land portions in both sides in the tire width direction, and the number of the sipes in the width direction provided in the shoulder land portion in the vehicle inner side is larger than the number of the sipes in the width direction provided in the shoulder land portion in the vehicle outer side, and
    wherein the sipe in the width direction provided in each of the shoulder land portions in both sides in the tire width direction is constructed by a waveform sipe having a three-dimensional structure in which wall surfaces are engageable with each other in a depth direction, and a wavelength of the sipe in the width direction provided in the shoulder land portion in the vehicle inner side is smaller than a wavelength of the sipe in the width direction provided in the shoulder land portion in the vehicle outer side.

* * * * *

UNITED STATES PATENT AND TRADEMARK OFFICE
CERTIFICATE OF CORRECTION

PATENT NO. : 8,544,513 B2
APPLICATION NO. : 12/573917
DATED : October 1, 2013
INVENTOR(S) : Tetsuji Miyazaki It is certified that error appears in the above-identified patent and that said Letters Patent is hereby corrected as shown below:

On the title page

Item 73, after "Toyo Tire & Rubber" change "Company Co." to --Co.--.

Signed and Sealed this
Third Day of December, 2013

Margaret A. Focarino
*Commissioner for Patents of the United States Patent and Trademark Office*